(12) United States Patent
Rothenberg et al.

(10) Patent No.: US 7,436,588 B2
(45) Date of Patent: Oct. 14, 2008

(54) METHOD AND SYSTEM FOR HYBRID COHERENT AND INCOHERENT DIFFRACTIVE BEAM COMBINING

(75) Inventors: Joshua E. Rothenberg, Los Angeles, CA (US); Robert R. Rice, Simi Valley, CA (US); Michael G. Wickham, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/543,596

(22) Filed: Oct. 5, 2006

(65) Prior Publication Data

US 2008/0084605 A1    Apr. 10, 2008

(51) Int. Cl.
*H01S 3/00* (2006.01)
(52) U.S. Cl. ...................................... 359/349
(58) Field of Classification Search .................. 359/349
See application file for complete search history.

(56) References Cited

U.S. PATENT DOCUMENTS

| | | | |
|---|---|---|---|
| 5,373,526 A * | 12/1994 | Lam et al. .................. | 372/69 |
| 5,572,542 A * | 11/1996 | Dixon ........................ | 372/92 |
| 5,694,408 A * | 12/1997 | Bott et al. .................. | 372/6 |
| 5,717,516 A * | 2/1998 | Klein et al. ................ | 359/334 |
| 6,192,062 B1 | 2/2001 | Sanchez-Rubio et al. | |
| 6,208,679 B1 | 3/2001 | Sanchez-Rubio et al. | |
| 6,229,940 B1 * | 5/2001 | Rice et al. .................. | 385/33 |
| 6,327,292 B1 | 12/2001 | Sanchez-Rubio et al. | |
| 6,366,356 B1 | 4/2002 | Brosnan et al. | |
| 6,519,385 B1 * | 2/2003 | Green ........................ | 385/27 |
| 6,597,836 B2 * | 7/2003 | Johnson et al. ............ | 385/33 |

(Continued)

FOREIGN PATENT DOCUMENTS

WO      WO 03/036766      5/2003

OTHER PUBLICATIONS

Shay, T.M. & Benham, V. "First Experimental Demonstration of Phase Locking of Optical Fiber Arrays by RF Phase Modulation". *Proceedings of SPIE* vol. 5550. pp. 313-319 (2004).

(Continued)

*Primary Examiner*—Deandra M Hughes

(57) ABSTRACT

A hybrid beam combining system or method combines a plurality of coherent and incoherent light beams into a composite high power diffraction limited beam. N oscillators each transmit light at one of N different wavelengths and each wavelength is split into M constituent beams. M beams in each of N groups are phase locked by a phase modulator using phase correction signals. The phase locked beams are amplified and coupled into an M×N fiber array. Beams emerging from the array are collimated and incident on a diffractive optical element operating as a beam combiner combining the M outputs at each N wavelength into a single beam. The N single beams are incident and spectrally combined on a grating which outputs a composite beam at a nominal 100% fill factor. A low power sample beam, taken from the N beams emerging from the diffractive optical element, is measured for phase deviations from which the phase correction signals are derived and fed back to the phase modulators. The diffractive optical element may include a weak periodic grating for diffracting the low power sample. The diffractive optical element may also be combined with the spectral combining grating into a single optical element.

20 Claims, 9 Drawing Sheets

U.S. PATENT DOCUMENTS

| | | | |
|---|---|---|---|
| 6,678,288 B2* | 1/2004 | Rice | 372/6 |
| 6,678,294 B1* | 1/2004 | Komine et al. | 372/38.01 |
| 6,697,192 B1 | 2/2004 | Fan et al. | |
| 6,708,003 B1 | 3/2004 | Wickham et al. | |
| 6,717,719 B1* | 4/2004 | Moore | 359/340 |
| 6,813,069 B2* | 11/2004 | Rice et al. | 359/349 |
| 7,088,743 B2* | 8/2006 | Rice et al. | 372/6 |
| 7,212,285 B2* | 5/2007 | Goto et al. | 356/328 |
| 7,221,499 B2* | 5/2007 | Rice et al. | 359/349 |
| 2003/0062468 A1* | 4/2003 | Byren et al. | 250/216 |
| 2005/0035295 A1* | 2/2005 | Bouma et al. | 250/341.1 |
| 2005/0135815 A1* | 6/2005 | Gerwe et al. | 398/188 |
| 2005/0157761 A1 | 7/2005 | Rothenberg et al. | |
| 2006/0109876 A1 | 5/2006 | Donghue et al. | |
| 2007/0086010 A1 | 4/2007 | Rothenberg | |
| 2007/0201795 A1* | 8/2007 | Rice et al. | 385/39 |

OTHER PUBLICATIONS

M. Wickham et al., "Coherently Coupled High Power Fiber Arrays", 2006 Digest of the LEOS Summer Topical Meeting (IEEE Cat. No. 06$^{th}$8863C IEEE Piscataway, New Jersey, USA Jun. 2006, pp. 23-24.

T.H. Loftus et al., "Spectrally Beam-Combined Fiber Laser for High-Average-Power Applications", IEEE Journal on Selected Topics in Quantum Electronics IEEE USA, vol. 13, No. 3, May 2007, pp. 487-497.

PCT International Search Report and the Written Opinion of the International Searching Authority dated Apr. 17, 2008 for International Application No. PCT/US2007/078288 filed Sep. 12, 2007.

* cited by examiner

METHOD AND SYSTEM FOR HYBRID COHERENT AND INCOHERENT DIFFRACTIVE BEAM COMBINING

This application is related to U.S. patent application Ser. No. 11/361,352 filed Feb. 24, 2006; U.S. patent application Ser. No. 11/543,677 filed Oct. 5, 2006; U.S. patent application Ser. No. 11/543,613 filed Oct. 5, 2006; and U.S. patent application Ser. No. 11/543,567 filed Oct. 5, 2006; all of which are fully incorporated herein by reference.

BACKGROUND OF THE INVENTION

1. Field of the Invention

The present invention relates to combining light beams using diffractive beam combining in conjunction with a spectral beam combining.

2. Description of Related Art

High power lasers have many possible applications. In a military application, sufficient energy focused in a laser beam can provide an effective defensive countermeasure against ballistic projectiles. In a commercial application, a high power laser can be used to weld metal components that are too thick to be welded by conventional methods. To improve the effectiveness of the laser in any of these applications, the power transmitted by the beam may be enhanced by focusing the beam to its far-field diffraction limit, i.e., into as small an area as theoretically possible. A laser beam focused to this theoretical limit is said to be diffraction limited. Generally speaking, advancement of the art of high power lasers is impeded by physical limitations encountered when attempting to achieve this limit.

Lasers by their nature are ideally diffraction-limited, such that the smallest possible area of focus is limited by the product of the focal distance and the diffraction limited angle, which is the wavelength of the light divided by the aperture width. Thus, the larger the aperture, the tighter the focus. However, there are practical limitations on the size of an aperture that can be designed for any optical apparatus. Imperfections in the optics may cause degradations in the laser wavefront that affect the focus, and in high power applications, thermal variations contribute to the degradation. This limits the designer's ability to focus the beam, resulting in a focal spot somewhat greater than 1.0 times the diffraction limit (1.0×DL). Practically speaking, the designer's goal is to achieve a near-diffraction-limited laser (i.e., one that approaches 1.0×DL) that operates at as high a power level as possible.

At present, the most advanced near-diffraction-limited laser beams cannot deliver enough power per unit area to serve effectively in high-power applications. In one case, an optimized beam can deliver a 3 kW beam having a diffraction limit of nearly 1.0. In another case, an optimized beam can deliver a 10 to 12 kW beam that is about 1.5 times diffraction limited. An objective of ongoing research in this field is to design a laser generator that can deliver 100 kW or more in a near-diffraction-limited beam.

One method for increasing the power deliverable by lasers is to combine the power of many coherently phased beams of a common wavelength by arranging a plurality of optical fiber emitters in a two-dimensional array. A beam splitter may be placed at the output of the array to sample the constituent beams. Each of the sampled beams is directed to a phase sensor, and the measured error signals are provided to phase modulators in each beam to ensure all the beams have equal phase. However, even in the most tightly packed array, the "fill factor" of the composite beam (ratio of the composite beam power to a beam that uniformly fills the entire array aperture and has equal peak intensity) is only about 70%, due to voids that occur between fibers and also to the Gaussian shape of each beam. The end result is a reduction in brightness by the fill factor ratio—the focused composite beam has a central peak intensity equal to the fill factor ratio times the maximum intensity possible with an ideal uniform beam, with the remaining power appearing in widely separated side lobes. In other words the composite beam has a shape dramatically different than that of the constituent beams, and as a result the composite does not focus as well as the constituents.

Another known method for combining beams is spectral combining, in which many incoherent beams, i.e. beams of different wavelengths, are superimposed. The beams are transmitted through a prism or grating that aligns the beams along a common path, creating, in essence, a singular beam of multiple colors. Thus the composite beam has a shape that is substantially identical to that of the constituent beams. While this technique therefore eliminates the fill factor problem associated with the two-dimensional array, other problems arise from using multiple wavelengths. For one, the complexity of the system increases as each wavelength requires a different oscillator. Furthermore, the propagation angle of each wavelength must be precisely adjusted such that its incidence on the grating is exact, otherwise the beams will misalign. More importantly, each wavelength may behave differently as the beam propagates through various media. Atmospheric absorption is a function of wavelength, therefore a spectrally combined beam directed through air is more susceptible to energy loss than a single-wavelength selected for optimal transmission efficiency. Spectral combining has been proposed, for example, in U.S. Pat. No. 6,697,192, U.S. Pat. No. 6,327,292, U.S. Pat. No. 6,208,679, and U.S. Pat. No. 6,192,062.

Another proposed technique for increasing the power in a laser beam is to (coherently) combine, by constructive interference, a plurality of beams into a single coherent beam. This technique, known as coherent diffractive beam combining, is the subject of co-pending U.S. patent application Ser. No. 11/361,352 filed Feb. 24, 2006, which is incorporated by reference herein as though set forth in full. In general, the co-pending application teaches generating a plurality of input beams, all having a common wavelength, using a master oscillator. Each beam is individually amplified and transmitted through a fiber emitter, and the emitter outputs are combined into a single output beam using a diffractive optical element (DOE). The technique includes a means for actively controlling the phases of the multiple beams using feedback to optimize the efficiency of the beam combination. This may be accomplished by coupling a phase modulator to each input beam, and by coupling a phase detector to a sampling of the output beam. The sampling is obtained by placing a transmissive beam splitter in the output path that reflects a low power portion of the output to the phase detector. Using electronics, correction signals based on phase deviations detected at the output are fed back to the modulators. An exemplary means for effecting active phase control in this fashion is disclosed in U.S. Pat. No. 6,708,003, which is also fully incorporated herein by reference. Another active phase detection and control method has been demonstrated by T. M. Shay et al., Proceedings of the SPIE, Vol. 5550, pp. 313-319 (2004), which is also fully incorporated herein by reference. An advantage of this approach is that, similar to SBC, the combined output beam has a shape that is substantially identical to the composite beams and therefore eliminates the fill factor reduction in the intensity of the focused coherent output beam. However, disadvantages occur when sampling the phases of the high power combined output beams. A high power beam passing through a transmissive beam splitter causes thermal distortion that affects the phase measurement accuracy and focusability of the output beam. Also in this method, a single detector is used to measure the phases of all the constituent beams. For a very large number of combined beams the accuracy of phase measurement becomes more difficult with a single detector.

SUMMARY OF THE INVENTION

The present invention provides a hybrid beam combining system or method for combining a plurality of light beams having identical and different wavelengths into a composite high power diffraction limited beam. A system according to the invention includes N oscillators each transmitting light at one of N different wavelengths. Using beam splitters, each wavelength is split into M constituent beams, and the M beams in each of N groups are phase locked by phase modulators according to phase correction signals provided to the phase modulators in a feedback loop. The phase locked beams are amplified and coupled into an M×N array of optical emitters. Beams emerging from the array are collimated and incident on a diffractive optical element (DOE) operating as a beam combiner. The DOE coherently combines the M constituent beams at each of N wavelengths into a single beam, creating N incoherent beams. The N beams are incident and spectrally combined on spectral beam combining (SBC) grating, which outputs a composite beam that is substantially identical to the constituent input beams, and thereby achieving nominally one hundred percent fill factor. N low power sample beams, taken from the N beams emerging from the DOE, are measured for phase deviations from which the phase correction signals are derived and fed back to the phase modulators. In one embodiment, the DOE may include a weak periodic grating for diffracting the low power samples, or the samples may be extracted from a spurious diffraction order of the SBC grating. In another embodiment, a single optical element may comprise a DOE grating and an SBC grating, which also provides low power samples of the N combined beams.

In a related method according to the invention, light beams of different and identical wavelengths are combined into a single high power beam by transmitting light beams at N different wavelengths, splitting each one of the N beams into M beams of common wavelength, synchronizing phases of the M beams at each N wavelength according to phase correction signals, and combining M×N light beams into N incoherent beams, where each incoherent beam is a coherent combination of M beams at one of the N wavelengths. The method further includes extracting a sample beam from the combined incoherent beams, detecting the phases of the M beams at each N wavelength, deriving phase correction signals from the detected phases, and spectrally combining the N incoherent beams into a single composite beam.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. The invention will be better understood upon consideration of the specification and the accompanying drawings, in which like reference numerals designate like parts throughout the figures, and wherein:

DETAILED DESCRIPTION OF THE PREFERRED EMBODIMENTS

Coherent Diffractive Beam Combining

A coherent diffractive beam combining method has been proposed in co-pending U.S. patent application Ser. No. 11/361,352 by inventors named in the present application. In general, the diffractive beam combining method employs a DOE to enable the coherent combination of the output of a plurality of fiber amplifiers transmitting laser beams derived from a common oscillator. The beam combination method requires active phasing of the outputs from the fiber amplifiers to lock the phases of the output beams in order to optimize intensity of the composite beam by means of constructive interference. Active phasing is achieved by placing a beam splitter in the path of the composite beam that is diffracted by the DOE. The beam splitter produces a low power sample of the composite beam, and the sample is focused onto a phase detector. In the phase detector, the output phase of each constituent beam is detected by decoding signals that are encoded on each constituent beam. Using electronics, the phases are measured by comparison to reference signals from the master oscillator, and correction signals derived from this comparison are fed back to phase modulators in a low power section of each fiber amplifier to achieve optimal phasing.

Hybrid Diffractive Beam Combining

Hybrid beam combining, as used herein, refers to a beam combining system or method that combines both coherent and incoherent beams. In a purely coherent system, such as the one described in the previous paragraph, there may be a limit to the number of input beams that can be combined due to bandwidth limitations or to cumulative errors introduced by encoding and detection techniques. It may be desirable, then, to use an incoherent beam combining method such as spectral combining (which uses no encoding) in concert with coherent combining in order to maximize the number of beams being combined, and hence, the total power output of the system.

Figure 1:
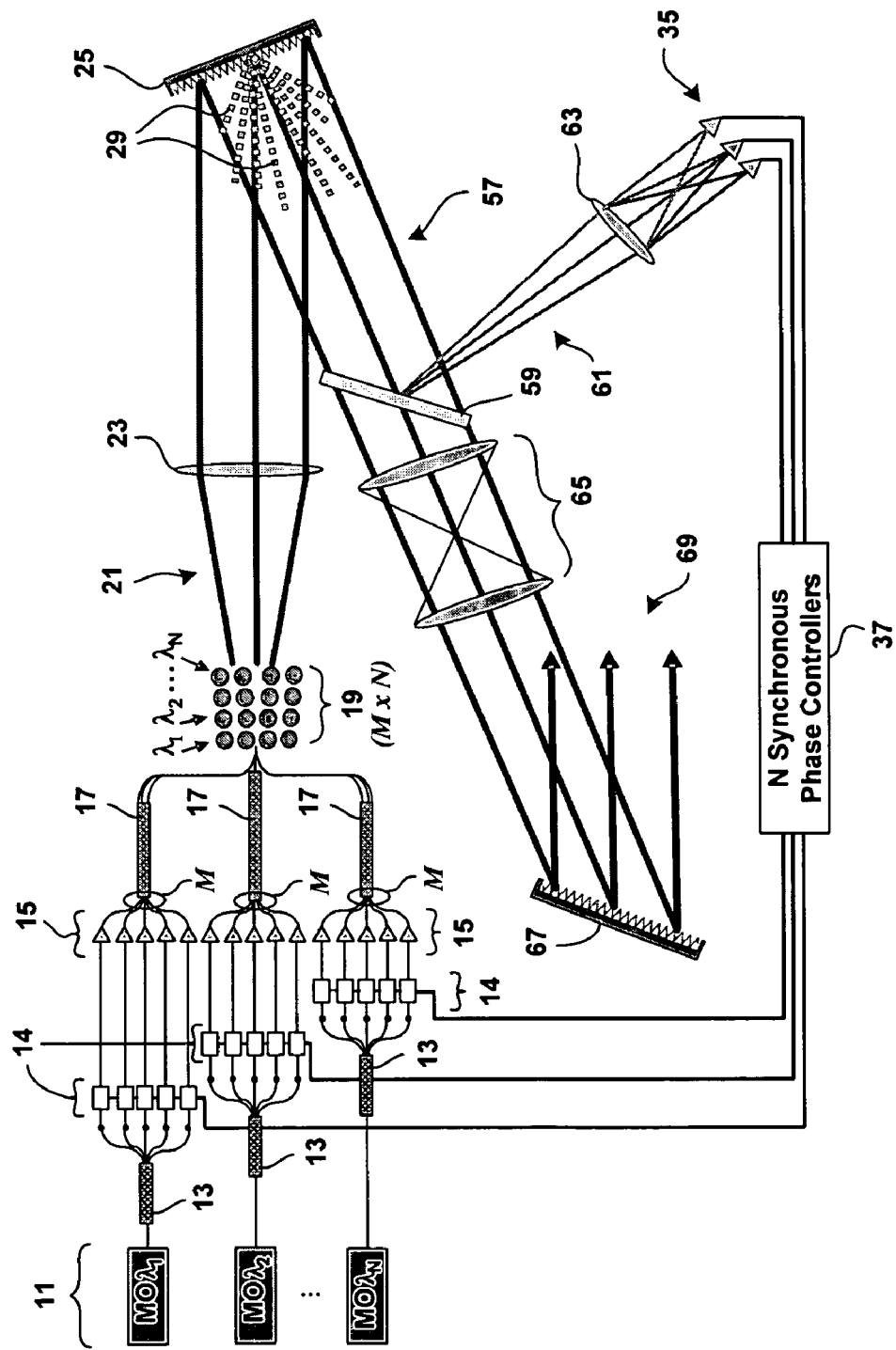
FIG. 1 is a block diagram of a hybrid system according to the invention that integrates spectral beam combining and coherent diffractive beam combining.

A basic hybrid beam combination scheme is shown in FIG. 1. In this embodiment, N master oscillators 11 generate N slightly different wavelengths $\lambda_1, \lambda_2, \ldots \lambda_N$. A total of N 1:M splitters 13 split each oscillator output beam into M beams. Each of the M beams from each of the N oscillators 11 is modified for active phase control by a corresponding feedback dependent phase modulator 14. Collectively, the N×M phase modulators 14 form a phase modulation stage.

In one embodiment, one or more phase modulators may comprise a lithium niobate modulator. Each phase modulator modifies the phase of each of the M signals at a given wavelength. The embodiment of FIG. 1 shows five modulators 14, i.e. M has a value of 5, while N is indicated as an indefinite integer. However, it should be appreciated that other embodiments are possible wherein both M and N may assume any integer value.

Each of the M beams is amplified to a desired power level by means of a corresponding amplifier 15. Each group of M amplifier outputs is coupled to a linear array of M fiber emitters 17. In one embodiment, each array of fiber emitters 17 is selected to transmit beams of like polarization. The N linear arrays of M fiber emitters 17 are arranged in a two-dimensional M×N array 19. In array 19, each of the N columns comprises the linear array of M fiber emitters from the M amplifier outputs at a given wavelength $\lambda_1, \lambda_2, \ldots$ or $\lambda_N$.

The M×N output beams 21 of array 19 are collimated by an appropriate reflective or transmissive collimating optic 23, such that all beams are collimated, and have slightly different, but precisely determined angles of propagation. The collimated beams are incident onto a DOE 25 located in the back focal plane of collimating optic 23 to insure optimal overlap of the many beams incident thereon. DOE 25 operates as an M:1 beam combiner such that the M beams incident on DOE 25 at each wavelength $\lambda_1, \lambda_2, \ldots \lambda_N$ are coherently combined into a single beam with high efficiency. With proper design of the DOE, the combination efficiency can exceed 95%. This method does not require an array with closely packed fiber emitters, and the combined beam suffers no reduction in brightness from the low fill factor of the array. Thus, the output of DOE 25 consists of N (incoherent) beams 57, at wavelengths $\lambda_1, \lambda_2, \ldots$ or $\lambda_N$, where each of the N beams is composed of M coherently combined beams. In a preferred embodiment, the intensity of each coherent combination of M beams is maximized along a single diffraction order. In one embodiment, the single diffraction order is the $0^{th}$ diffraction order. In another embodiment, at least one coherent combination of M beams has a maximum intensity along one diffraction order. Some amount of spurious diffracted output beams 29 of minimal intensity also emerge from DOE 25.

In the embodiment of FIG. 1, an optic such as beam splitter 59 provides a means for extracting a sample of the M×N light beams combined by DOE 25. Beam splitter 59 is placed in the path of combined beams 57, and reflects a low power sample of the combined N beams 61, one at each wavelength $\lambda_1, \lambda_2, \ldots \lambda_N$. Each of the combined beams in 57 at wavelengths $\lambda_1, \lambda_2, \ldots \lambda_N$ has a slightly different angular displacement due to displacement of each column in the M×N array 19. Therefore a lens 63 may be placed in the optical path to focus the N sample beams 61 to spatially separated phase detectors 35. Each phase detector 35 then senses the phases of only the M constituent beams at a given wavelength λ that are combined by DOE 25. Active phase synchronization effected by means of N phase controllers 37 results in efficient combination of the M beams at each wavelength λ.

For an input beam at normal incidence to the DOE, the diffracted angle of the $m^{th}$ order is $$\sin \theta_m = m\lambda/P \qquad (1)$$

where λ is the wavelength and P is the period of the phase pattern on the DOE. Therefore the separation angle is slightly different among the M beams at each wavelength (for small angles the separation angle is ~λ/P). The M×N array is therefore not quite rectangular, as shown (exaggerated) in FIG. 1. This variation in separation angle for each of the N columns will generally be quite small, proportional to the relative change in wavelength. Typically this wavelength spread $\Delta\lambda/\lambda$ is ~1% for an SBC system.

The N angularly displaced combined beams 57 pass through optional relay optics 65 and are imaged onto an SBC grating 67 to ensure complete beam overlap, while preserving the required angles of incidence. The wavelength of each of the N combined beams 57 (by way of the N master oscillators) is chosen in accordance with the angular dispersion of SBC grating 67 to precisely compensate for angular deviation. Thus, a single diffraction limited beam 69 can be formed at the output, which combines all M×N beams, with high efficiency and with little power in the spurious diffracted orders.

Due to differences in the lengths of fibers in array 19, and to variations caused by vibrations and temperature fluctuations, slight variations in phase may occur in each of the M×N beams 21 emerging from the array. A feedback control loop is provided to correct these variations and lock the phases of beams 21 having common wavelengths to ensure maximum efficiency in coherent combinations thereof. In the feedback loop, sample beam 61 may be focused by an appropriate optic 63 (e.g. a lens or curved mirror) to direct sample beam 61 to a phase detection stage 35. Phase detection stage 35 provides a means for detecting the phase of each of the M beams that form one of the N coherent output beams of composite output 57.

In one embodiment, encoded signals may be applied to each of the M×N optical signals at the phase modulation stage. Then, at each of N phase detectors 35, one for each wavelength, synchronous detection of the coded signals on each beam can be used to measure the output phase of each constituent beam. Ideally, N phase controllers 37 apply correction signals to lock the M measured phases at each wavelength to a single uniform value. However, systematic variations caused by the sampling optics or decoding electronics may require adjustment of each of the M phases to differing optimized values. These values can be determined by a calibration procedure that optimizes the combination efficiency of each group of M beams into a desired diffraction order. The phase controllers 37 compare the measured phases to these optimized reference values, and derive M correction signals based on the comparisons at each of N wavelengths. The M×N correction signals are fed back to M×N phase modulators 14, which lock the phases of each group of M optical signals together according to the correction signals. Various known techniques for phase synchronization of optical signals (e.g. encoding using distinct dither frequencies, CDMA, TDMA, etc.) may be employed in the feedback loop without departing from the scope of the present invention. Examples of such techniques are discussed in greater detail in U.S. patent application Ser. No. 11/361,352, U.S. Pat. No. 6,366,356, U.S. Pat. No. 6,708,003, and T. M. Shay et al., Proceedings of the SPIE, Vol. 5550, pp 313-319 (2004). These techniques should be selected to allow the combined beams to be phased for maximum combination efficiency.

Compared with conventional SBC methods, a hybrid diffractive beam combining method according to the invention has many fewer wavelengths: N compared to M×N. Moreover, with N separate detectors the number of combined sources in the M×N array that must have their phase measured by a single detector is reduced to M. As a result, much less bandwidth is required for transmission and processing of signals in the feedback loop, and the presence of fewer signals reduces the cumulative degradation of the signal to noise in a single phase detector. These features advantageously open a broader class of amplifiers (and related electronics) to a designer when selecting components for a hybrid system according to the invention.

Figure 2:
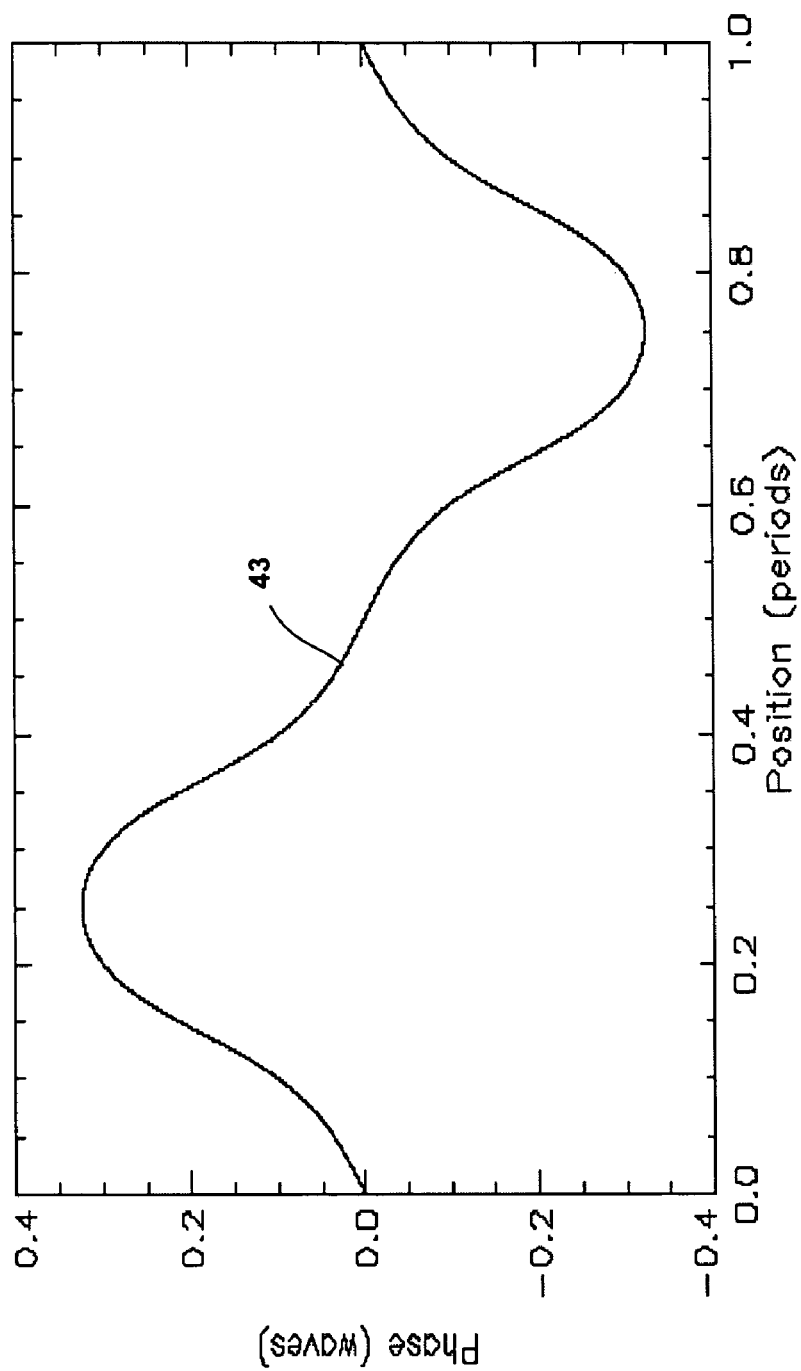
FIG. 2 is a plot of one example of a periodic phase pattern in a five-beam combiner DOE for splitting a single beam into five diffraction orders.
Figure 3:
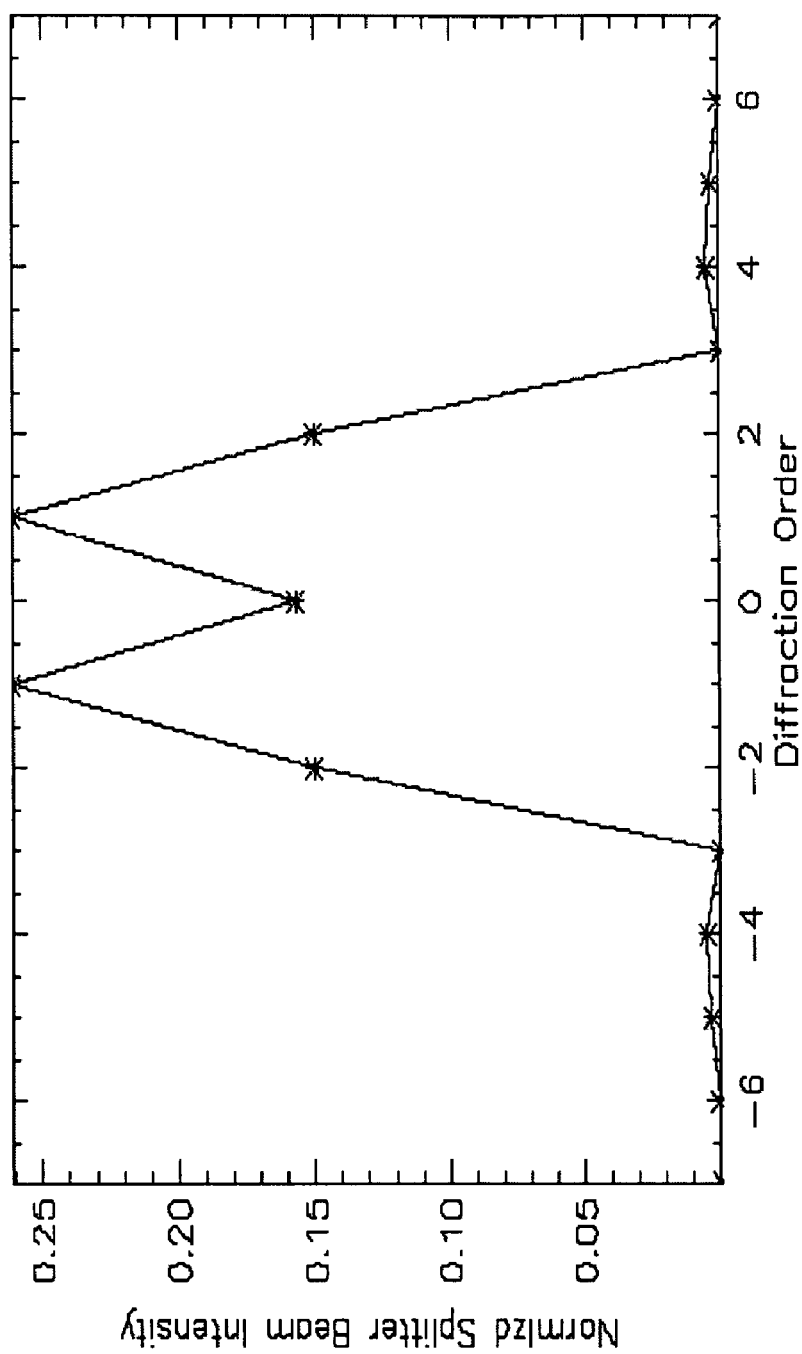
FIG. 3 is a plot showing normalized intensities of the five diffraction orders produced by the DOE of FIG. 2, when used as a beam splitter.

To further illustrate a DOE design appropriate for use in the foregoing embodiments, consider a simple DOE that splits a single beam into five diffracted beams in a 1D array. This simplified example is presented for illustration purposes only. DOEs can be designed to efficiently combine or split an arbitrarily large number of beams, in 1D or 2D arrays. The subject DOE has a pattern of parallel precisely-shaped main grooves etched on its surface, which upon reflection or transmission produces the 1D periodic phase pattern 43 plotted in FIG. 2 in waves (one wave equals $2\pi$ radians). For a reflective or transmissive DOE one wave of phase corresponds to an etch depth of $\lambda/2$ or $\lambda/(n-1)$, respectively, where n is the index of refraction of the DOE substrate. Thus, the phase pattern 43 corresponds to an appropriately scaled etch depth pattern on the DOE surface. If a single beam is incident on this DOE, approximately 98% of the power is split among five diffracted orders in a linear array. The remaining approximate 2% of power is distributed among spurious output beams diffracted at higher orders. A normalized plot of the distribution of the beam intensity among all diffracted orders is shown in FIG. 3. Note that the angles of the diffracted orders of the DOE are given by the usual grating equation. For an input beam at normal incidence the diffracted angle of the $m^{th}$ order is given by grating equation (1).

Figure 4:
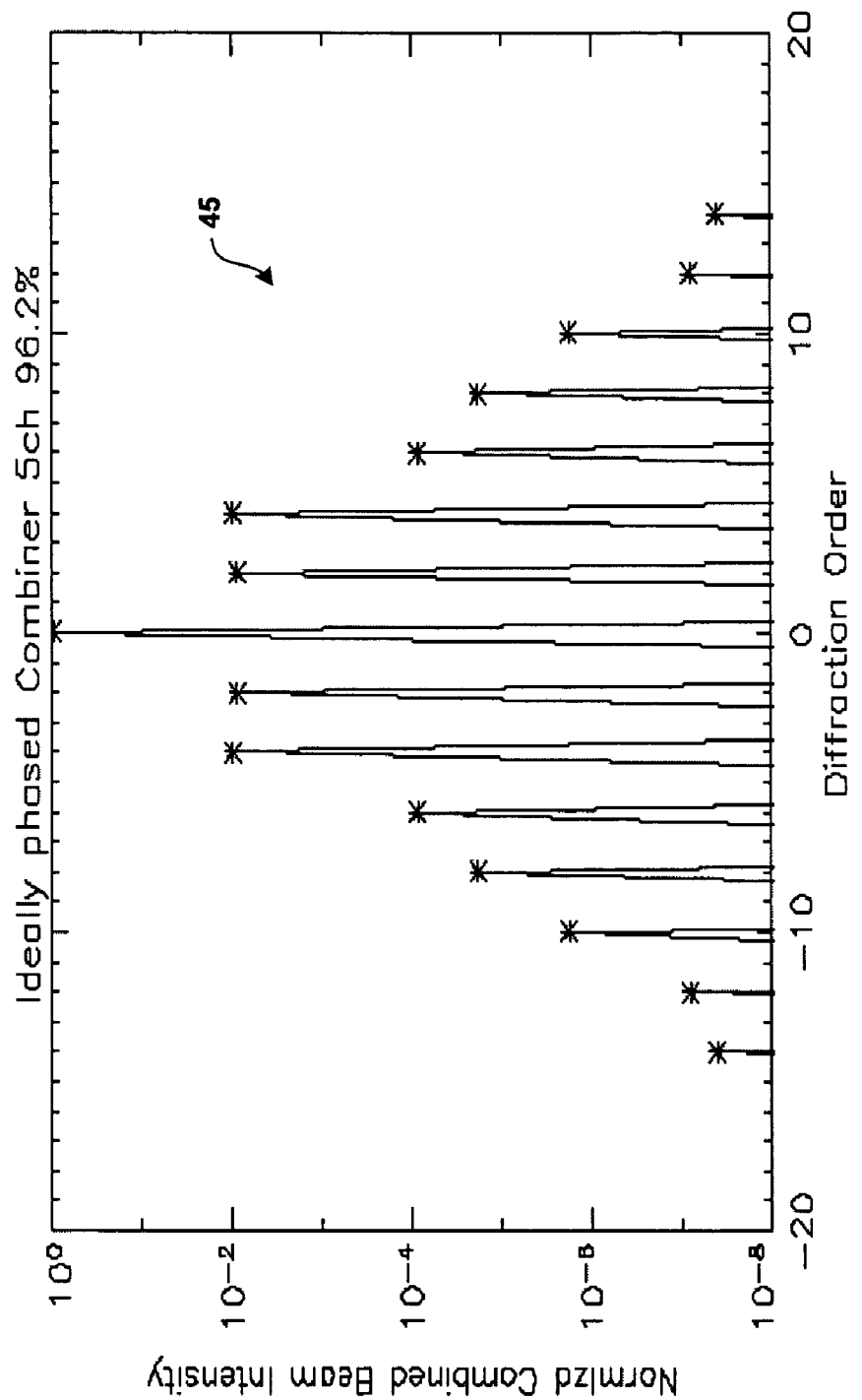
FIG. 4 is a logarithmic plot of normalized intensities vs. diffraction orders resulting when the DOE of FIG. 2 is used to combine five ideally phased beams.

Coherent diffractive beam combining is achieved by using the DOE "in reverse". That is, if (in the foregoing example) the five input beams are properly phased and pointed and have equal power, the DOE is designed to provide optimal efficiency of combination at about 96%. This efficiency is shown by the normalized intensities 45 of the diffracted orders plotted in FIG. 4. In this example, the desired output beam is the $0^{th}$ diffracted order, which has an intensity about two orders of magnitude higher than the intensity of any other diffraction order, as shown. In another embodiment, when the relative powers of the input beams are adjusted to match the distribution of FIG. 3, the DOE provides an optimal combination efficiency equal to the splitting efficiency of about 98%.

Figure 5:
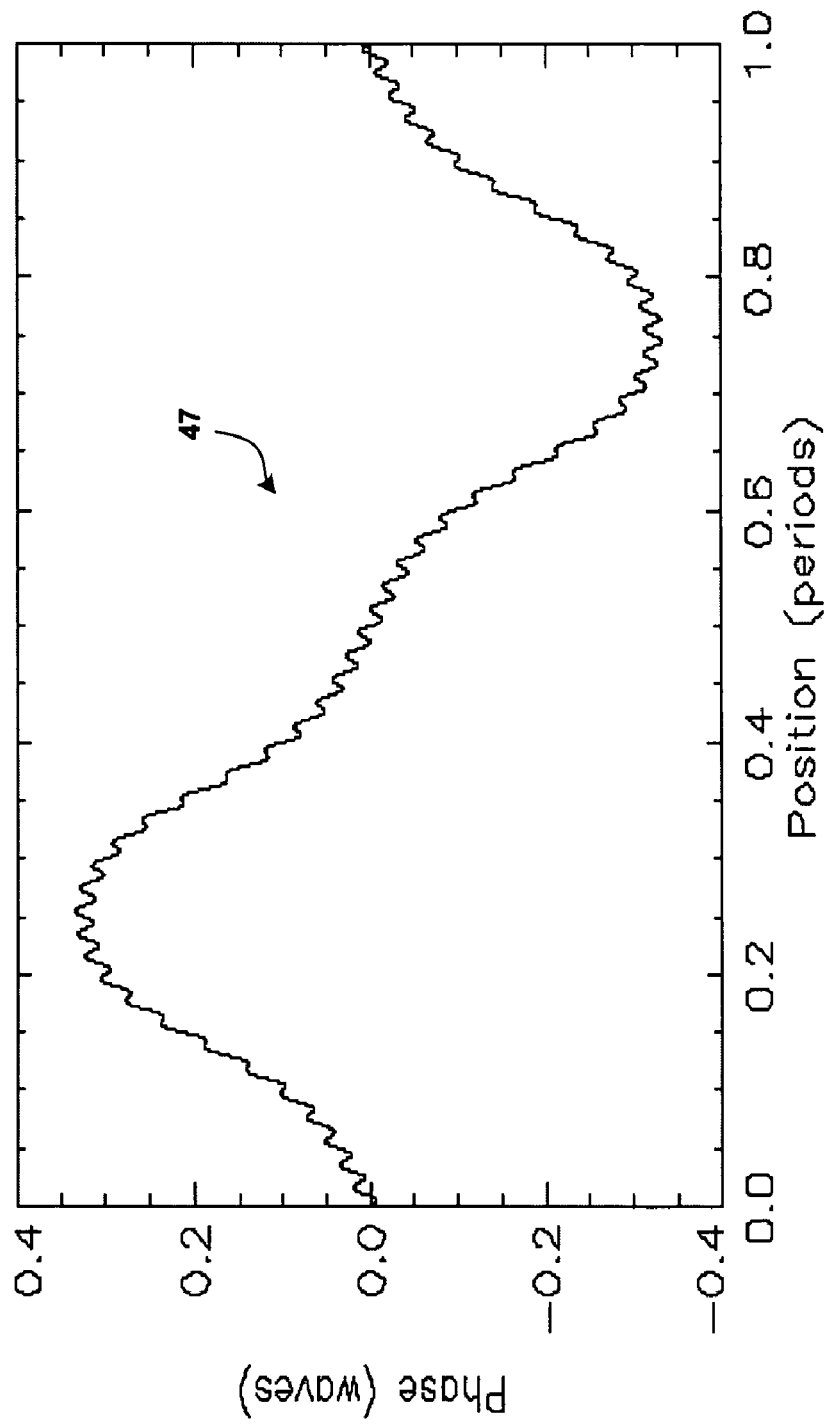
FIG. 5 is a plot of another example of a periodic phase pattern in a five-beam combiner DOE having an added sinusoidal sampling grating.
Figure 6:
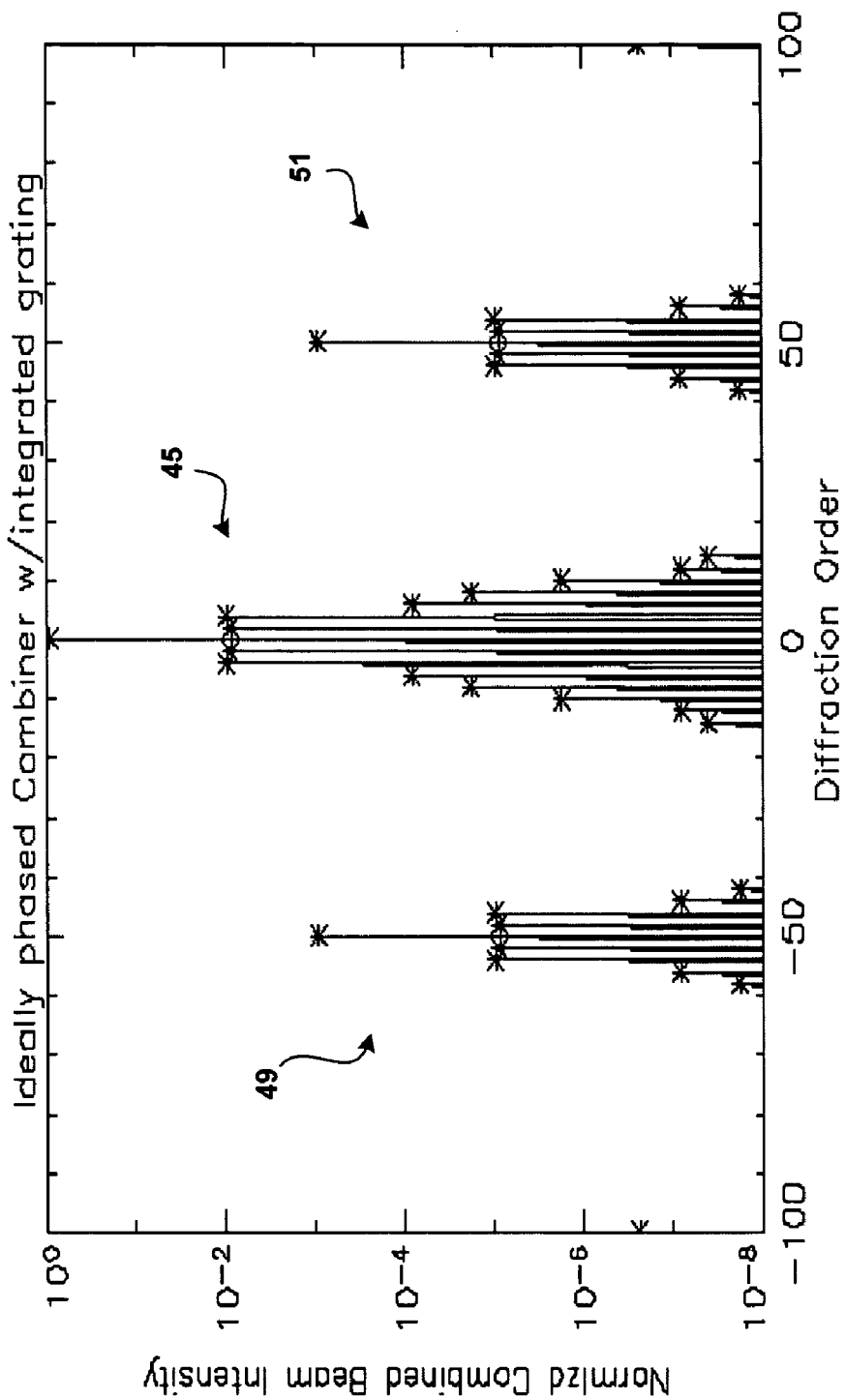
FIG. 6 is a logarithmic plot of normalized intensities of diffraction orders resulting when the DOE of FIG. 5 is used to combine five ideally phased beams.

FIGS. 5-6 illustrate the sampling capability of a DOE. In one embodiment, the design of the five-beam combiner DOE of FIGS. 2-3 may be modified by adding a weak, short-period sinusoidal sampling grating. The peak-to-peak phase value of this particular sampling grating is selected as $\frac{1}{50}^{th}$ of a wave. A plot of the phase of the modified DOE with sampling grating is shown in FIG. 5. Here, the resulting phase pattern 47 appears as the short-period sinusoid superimposed on periodic phase pattern 43. When properly aligned to the modified DOE, ideally phased input beams are diffracted to produce the output shown in FIG. 6. Note that in FIG. 6, the central group of diffraction order intensities 45 centered about the $0^{th}$ order is the same distribution shown in the plot of FIG. 4. The left-hand diffraction order intensities 49, and right-hand diffraction order intensities 51, are centered about the $-50^{th}$ and $+50^{th}$ orders, respectively. Each of these intensity groups 49 and 51 provides a low-power representation of the distribution of intensities 45.

The DOE embodiment illustrated in FIGS. 5-6 has sampling grating grooves situated in parallel to the main grooves and therefore the sampled beam is in the same plane as the fiber array and spurious diffracted output beams. The period of the sampling grating in this example is taken to be $\frac{1}{50}^{th}$ of the DOE combiner period, and thus the beam sample is diffracted at an angle corresponding to the $\pm 50^{th}$ diffracted order of the combiner. As shown in FIG. 6, the sampled beam diffraction order intensities 49 and 51 are well separated from the spurious diffracted orders of the DOE combiner function. Skilled artisans should recognize that many other DOE embodiments are possible, wherein a sampling grating comprising a set of grooves is applied in any direction relative to the DOE combiner function such that the sampled beam departs the DOE in any convenient direction.

In the foregoing example, the sampling grating phase depth is selected to be $\frac{1}{50}^{th}$ of a wave. As a result the sample intensity in either of the two $\pm 50^{th}$ sampled orders is approximately $1 \times 10^{-3}$ of the main ($0^{th}$ order) output beam. As shown in FIG. 6, each of the primary sampled $\pm 50^{th}$ orders provides an identical low power copy of the fully combined beam. In general, a weak sinusoidal phase grating can be adjusted according to a desired sample fraction of approximately $2.5\phi^2$, where $\phi^2$ is the peak-to-peak phase amplitude of the grating measured in waves. The sinusoidal shape of a sampling grating leads to equal sampled beam intensities in both $\pm 50^{th}$ orders. In other embodiments of a DOE sampling grating, a "blazed" (i.e. more triangular) shape can be used to preferentially diffract light primarily into one of these orders, as is well understood in the grating art. However, for very high power applications, it may be necessary for the surface of the DOE to be etched more smoothly without any precipitous jumps. This advantageously allows the etched DOE to be over-coated with a very high reflectivity, low-absorption multilayer stack that conforms well and preserves the precise surface shape of the DOE.

It is noted that the sampling grating and the DOE combiner itself are dispersive, i.e. they have diffracted order angles that are wavelength dependent. At normal incidence, the dispersion for a grating with period P is given by $$d\theta/d\lambda = m/P \cos\theta = \tan\theta/\lambda \qquad (2)$$

Thus, a smaller period or a larger diffraction angle leads to larger dispersion. Depending on the bandwidth requirements for the system this may lead to a limitation on diffraction angle. In some embodiments, it may be necessary to compensate for a sample beam having such a large dispersion, for example, by placing a compensation grating in the path of the diffracted sample.

Figure 7:
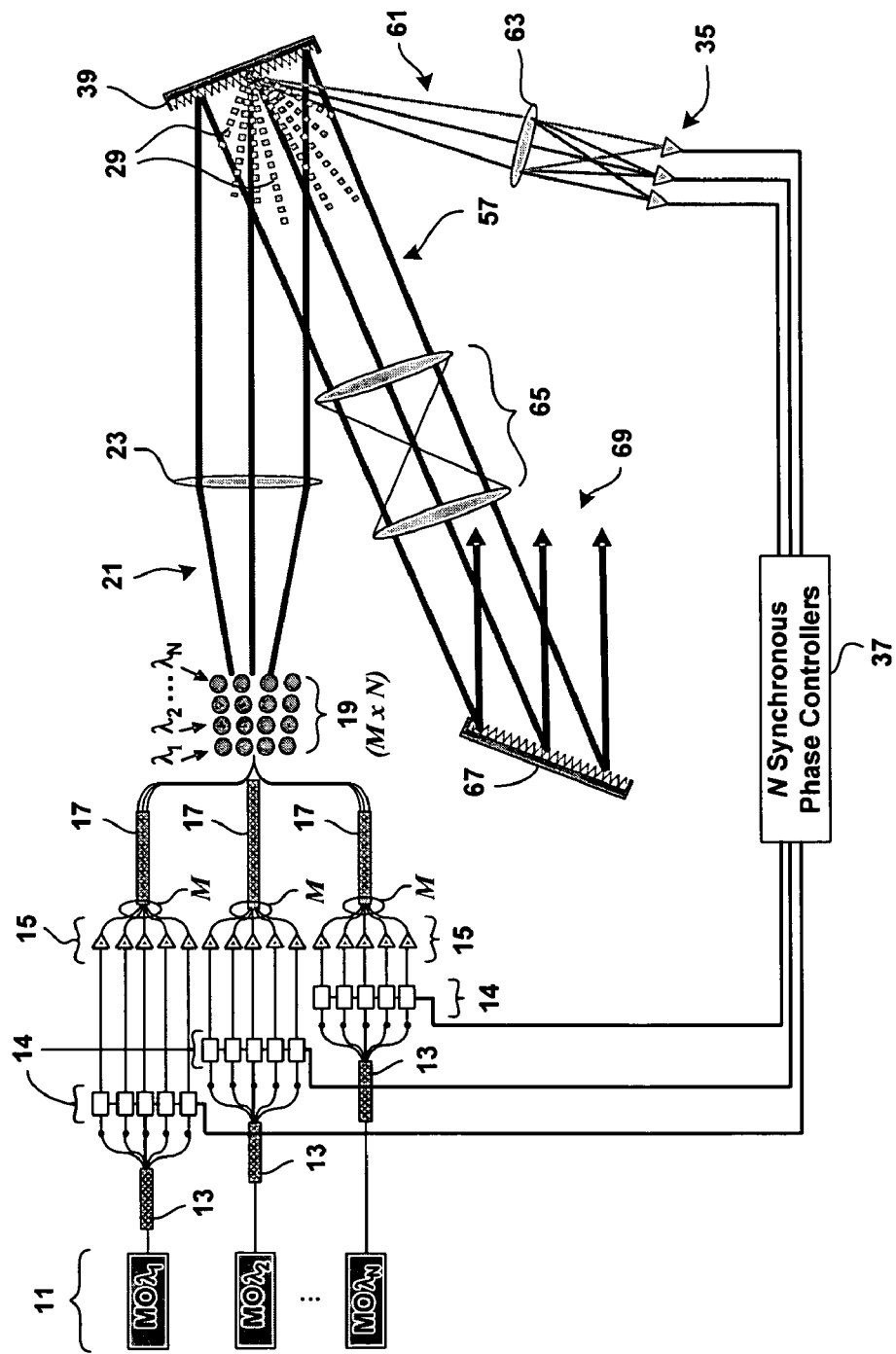
FIG. 7 is a block diagram of another embodiment of a hybrid system according to the invention that employs a DOE combiner and sampler.
Figure 8:
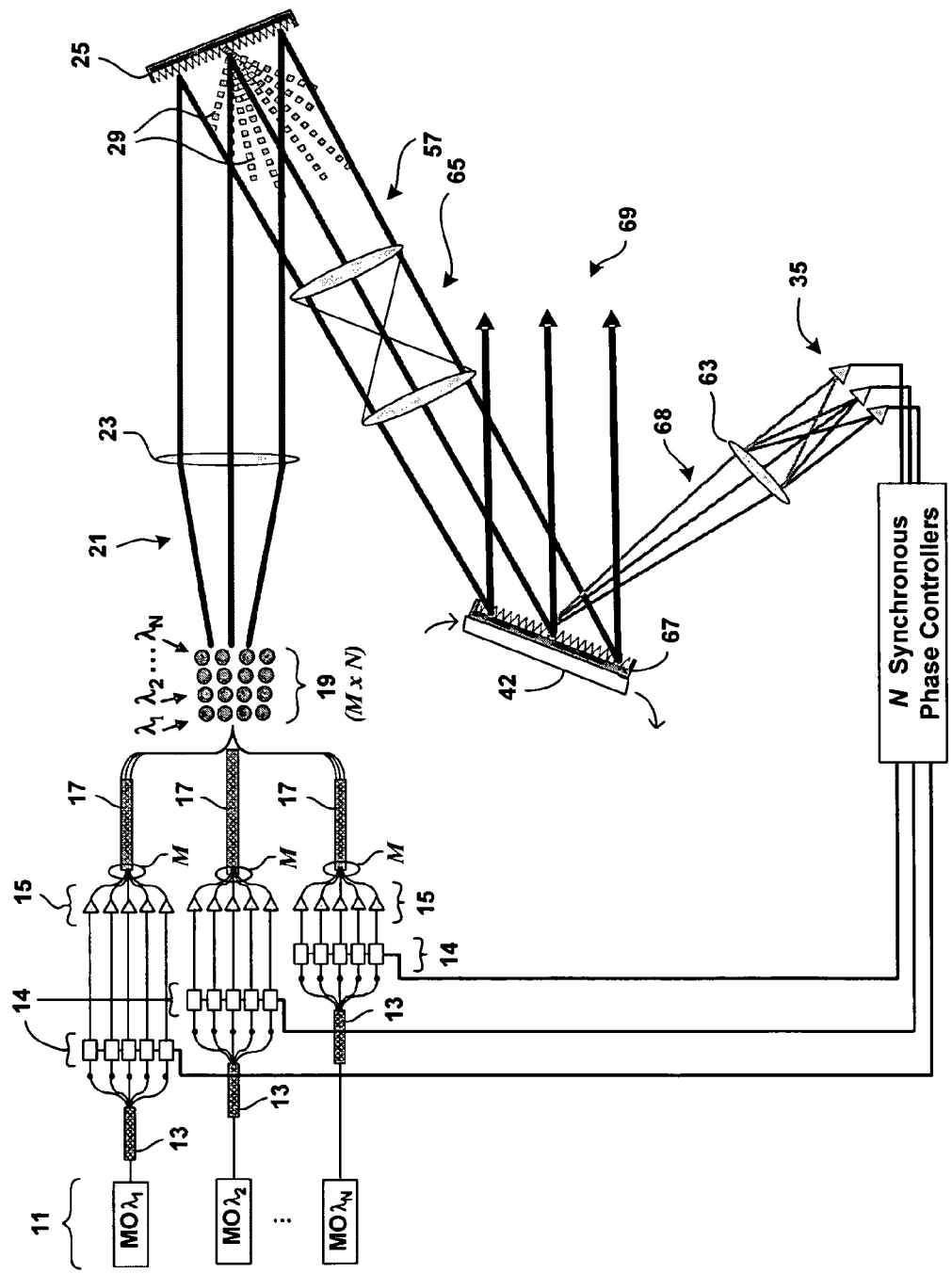
FIG. 8 is a block diagram of a hybrid system according to the invention in which the SBC grating functions as a spectral combiner and as a sampler.
Figure 9:
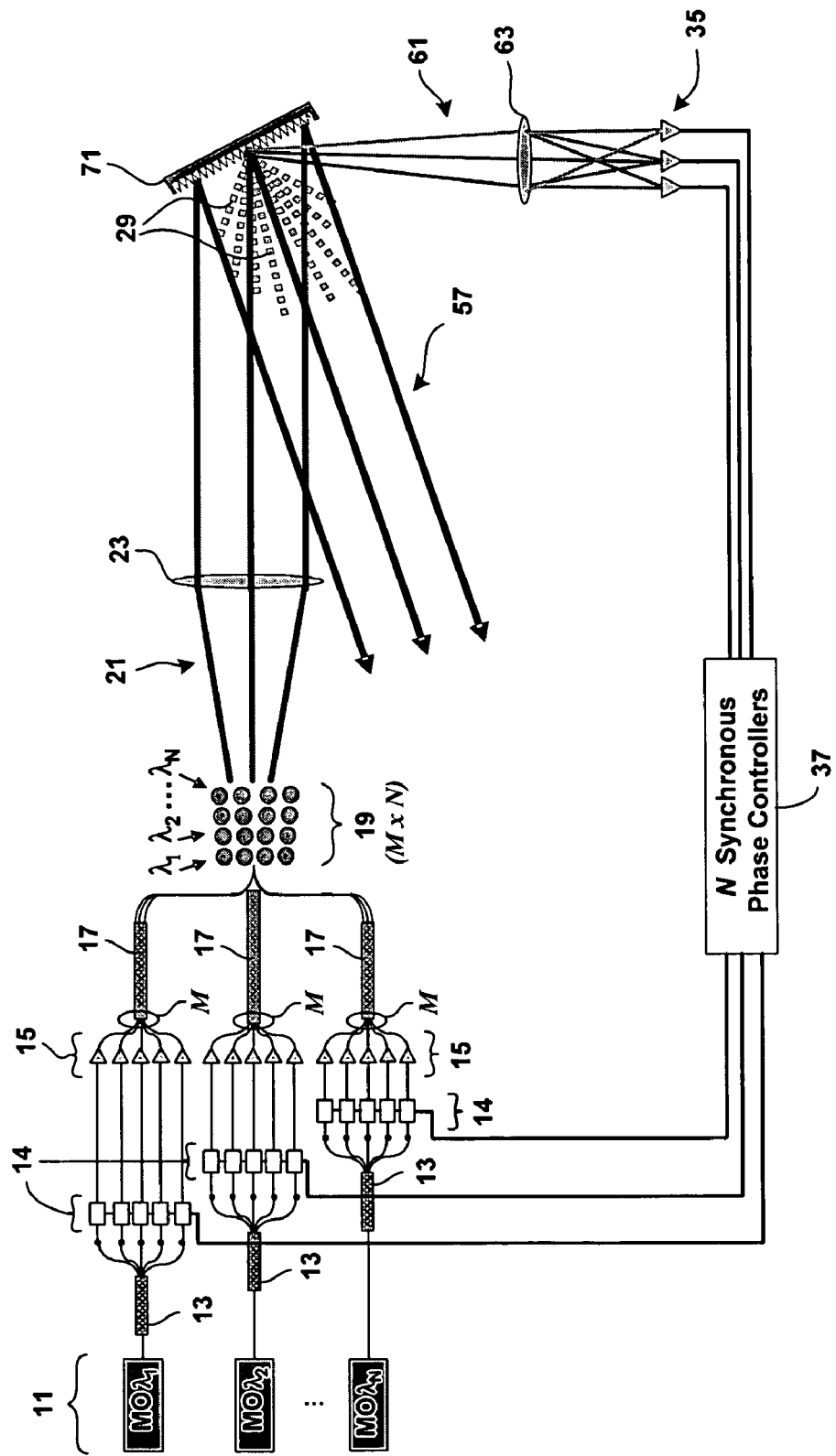
FIG. 9 is a block diagram of a hybrid system according to the invention in which the functions of the DOE and SBC grating are integrated into a single optical element.

FIGS. 7-9 illustrate the hybrid beam combining concept with simplified optical arrangements. In FIG. 7, in lieu of a beam splitter, the means for extracting a sample beam 61 of the M×N light beams is achieved by modifying DOE 39 by placing a periodic sampling grating on its surface. The sampling grating enables DOE 39 to diffract a low power sample beam 61 toward phase detectors 35. An appropriate lens or mirror 63 may be used to focus the sample beam 61 onto detectors 35. Thus, DOE 39 performs the following functions: combining plural input beams into coherent output beams, and diffracting a low power sample of the coherent output beams.

In another embodiment, a DOE having a low power diffracting means may further simplify the sampling optics by focusing the sample beam 61. The low power diffracting means may be a weak grating (not shown) superimposed on the surface of DOE 39. The N sample beams 61, each composed of a coherent combination of M beams of a given wavelength λ, and each propagating at slightly different angles, are focused by the sampling grating onto separated phase detectors 35. If a separate transmissive element were to be used for sampling, heat accumulating inside the element would tend to deform the element. This leads to distortions in the output beam that render it less focusable. Generally speaking, any time an element can be eliminated from the optical circuit, the system is more able to achieve the diffraction limit.

A DOE that generates focusing sample beams 39 may be fabricated, for example, by applying a more complex pattern of grooves rather than a simple grating of parallel grooves. The required grove pattern may be fabricated by conventional holography, wherein the grooves are formed by the interference of a point source at the desired location of focus and a plane wave. Alternately, conventional digital lithography based on a calculated grating pattern can be used to generate the required pattern of grooves.

Alternatively, as shown in FIG. 8, the desired sample beam can be achieved simply by exploiting the fact that in an SBC grating, a small percentage of spurious beams are diffracted at the $0^{th}$ order. Thus, in lieu of a separate beam splitter or DOE sampling grating, the N spurious $0^{th}$ orders of SBC grating 67 may be captured as sample beams 68.

Throughout the disclosure, the various DOEs and SBC gratings are shown in the figures as reflective optical elements. In one preferred embodiment, the DOE comprises a highly reflective dielectric stack on its surface having greater than 99% reflectivity to minimize power absorption. Alternatively, any DOE described herein may be fabricated as a transmissive element. However, reflective elements are preferred primarily because the non-reflecting side of a reflective element may be configured for cooling without introducing material into the optical path. In the example of FIG. 8, grating 67 is shown with an optional cooling means 42 abutting the non-reflecting side. Cooling means 42 may be any type of heat sink suitable for removing heat from Grating 67 or DOE 25 to ensure optical stability. For example, cooling means 42 may be a finned metal heat sink contacted to the grating or DOE by an adhesive with high thermal conductivity, a surface exposed to forced air, a conduit for the flow of coolant such as water, or a combination of any of the foregoing.

FIG. 9 illustrates another variation on a hybrid system according to the invention. This system operates similarly to the previous hybrid embodiments, except that in this embodiment, the functions of the DOE and the SBC grating are combined into a single optical element 71. In one implementation of this embodiment, the DOE grating and SBC grooves on optic 71 are combined such that the periodic pattern of DOE grating is orthogonal to the SBC grating grooves. Other implementations are possible, where the angle of the DOE grating pattern relative to the SBC grating pattern is other than orthogonal. Whatever relative angle is chosen, a corresponding adjustment in the spacing of emitters in array 19 may be required to maintain precision alignment of beams incident on optic 71. A fabrication method to effect any of these combinations of patterns on optic 71 may be achieved, for example, by precision etching of a transmissive layer deposited over one or more highly reflective layers. Such a method for fabrication of conventional gratings has been described previously in U.S. Pat. No. 5,907,436.

In the embodiment of FIG. 9, the $0^{th}$ order diffraction from the SBC grating grooves provides N sample beams 61 at differing wavelengths and angles. Each of these N sample beams is composed of M beams coherently combined by the DOE grating pattern. The sample beams 61 are utilized in similar fashion as in previous embodiments to provide phase correction signals to phase modulators in a feedback loop. In addition to combining the DOE grating and SBC grating into a single optical element 71, this embodiment provides a further advantage by eliminating intervening imaging and sampling optics.

In all of the above schemes, beams coherently combined by a DOE must be phased appropriately for maximum combination efficiency. The various approaches to accomplish this (e.g. using distinct dither frequencies, CDMA, TDMA, etc.) are not addressed specifically in this disclosure as they have been addressed in prior art, e.g. U.S. Pat. No. 6,708,003 and T. M. Shay et al., Proceedings of the SPIE, Vol. 5550, pp 313-319 (2004).

The invention has been presented in an illustrative style. The terminology employed throughout should be read in an exemplary rather than a limiting manner. While various exemplary embodiments have been shown and described, it should be apparent to one of ordinary skill in the art that there are many more embodiments that are within the scope of the subject invention. Accordingly, the invention is not to be restricted, except in light of the appended claims and their equivalents.

What is claimed is:

1. A system for combining light beams of different and identical wavelengths into a single composite beam of substantially identical shape as the individual beams, comprising:

N oscillators, each transmitting a light beam at a different one of N wavelengths;

one or more beam splitters for splitting each one of the N beams into M beams of common wavelength;

a phase modulation stage for locking phases of the M beams at each of the N wavelengths according to phase correction signals;

a diffractive optical element combining the M×N phase-locked light beams into N incoherent beams, each incoherent beam a coherent combination of M beams at one of the N wavelengths;

a phase detection means for detecting the phases of the M beams comprising each incoherent beam;

a means for deriving the phase correction signals from the detected phases; and a grating for spectrally combining the N incoherent beams into a single composite beam;

wherein M and N are integers.

2. The system of claim 1 wherein at least one coherent combination of M beams has a maximum intensity along the $0^{th}$ diffraction order of the diffractive optical element.

3. The system of claim 1 further comprising an array of fibers for directing the M×N light beams from the phase modulation stage to the diffractive optical element.

4. The system of claim 1 wherein the phase detection means includes an optic for extracting a low power sample of the M×N light beams combined by the diffractive optical element.

5. The system of claim 1 wherein the phase detection means receives a low power sample of the M×N light beams diffracted from the diffractive optical element.

6. The system of claim 1 wherein the phase detection means receives a low power sample of the M×N light beams diffracted from the grating.

7. The system of claim 6 wherein the low power sample comprises spurious beams diffracted at the $0^{th}$ diffraction order of the grating.

8. The system of claim 5 wherein the diffractive optical element comprises a sampling grating diffracting the low power sample.

9. A system for combining light beams of different and identical wavelengths into a single composite beam of substantially identical shape as the individual beams, comprising:

N oscillators, each transmitting a light beam at a different one of N wavelengths;

one or more beam splitters for splitting each one of the N beams into M beams of common wavelength;

a phase modulation stage for locking phases of the M beams at each N wavelength according to phase correction signals;

an optical element having both an SBC grating and a diffractive element, whereon incident M×N light beams are combined into a single composite beam comprising N incoherent beams spectrally combined by the grating, each incoherent beam a combination of M beams combined by the diffraction grating at one of the N wavelengths;

a phase detection means for detecting the phases of the M beams at each N wavelength; and a means for deriving the phase correction signals from the detected phases;

wherein M and N are integers.

10. The system of claim 9 wherein the diffractive element is orthogonal to the SBC grating.

11. The system of claim 10 wherein the optical element provides a sample beam to the phase detection means.

12. A method for combining light beams of different and identical wavelengths into a single composite beam of substantially identical shape as the individual beams, comprising:

transmitting light beams at N different wavelengths;

splitting each one of the N beams into M beams of common wavelength;

synchronizing phases of the M beams at each N wavelength according to phase correction signals;

combining M×N light beams into N incoherent beams, each incoherent beam a coherent combination of M beams at one of the N wavelengths;

extracting a sample beam from each of the combined incoherent beams;

detecting in the sample beam the phases of the M beams at each of N wavelengths;

deriving the phase correction signals from the detected phases; and spectrally combining the N incoherent beams into a single composite beam;

wherein M and N are integers.

13. The method of claim 12 further comprising, prior to the combining step, directing the light beams through an M×N fiber array to a diffractive optical element.

14. The method of claim 12 wherein each of the N incoherent beams has a maximum intensity along a single diffraction order of a diffractive optical element.

15. The method of claim 12 wherein the extracting step further comprises diffracting a low power sample of the combined M×N light beams by means of a diffractive optical element.

16. The method of claim 15 wherein the combining step and extracting step are effected by the same diffractive optical element.

17. The method of claim 12 wherein the extracting step further comprises diffracting a low power sample of the combined M×N light beams by means of an SBC grating.

18. The method of claim 17 wherein the low power sample comprises spurious beams diffracted at the $0^{th}$ diffraction order of the SBC grating.

19. The method of claim 12 wherein the extracting step further comprises diffracting a sample of the combined M×N light beams, the sample having total power less than about one percent of total power in the combined M×N light beams.

20. The method of claim 12 wherein the combining, extracting, and spectrally combining steps are effected by a single optical element.

* * * * *